US009626804B2

United States Patent
Endo et al.

(10) Patent No.: US 9,626,804 B2
(45) Date of Patent: Apr. 18, 2017

(54) ARTICLE INFORMATION PROVIDING APPARATUS THAT PROVIDES INFORMATION OF ARTICLE, ARTICLE INFORMATION PROVIDING SYSTEM, AND ARTICLE INFORMATION PROVISION METHOD

(71) Applicant: KYOCERA Document Solutions Inc., Osaka (JP)

(72) Inventors: Wataru Endo, Osaka (JP); Ayaka Ikejima, Osaka (JP); Akira Yuki, Osaka (JP); Masato Tanba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 41 days.

(21) Appl. No.: 14/721,458

(22) Filed: May 26, 2015

(65) Prior Publication Data

US 2015/0339860 A1  Nov. 26, 2015

(30) Foreign Application Priority Data

May 26, 2014 (JP) .................................. 2014-108117
Sep. 29, 2014 (JP) .................................. 2014-197831

(51) Int. Cl.
*G06T 19/00* (2011.01)
*G06K 9/00* (2006.01)

(52) U.S. Cl.
CPC ........ *G06T 19/006* (2013.01); *G06K 9/00671* (2013.01)

(58) Field of Classification Search
None
See application file for complete search history.

(56) References Cited

U.S. PATENT DOCUMENTS 7,397,464 B1 * 7/2008 Robbins ................ G06F 3/0425
 345/156
7,511,703 B2 * 3/2009 Wilson .................. G06F 3/0425
 178/18.09

(Continued)

FOREIGN PATENT DOCUMENTS

JP 2011-253324 A 12/2011
JP 2013-105346 A 5/2013

(Continued)

OTHER PUBLICATIONS

Yutaka Karutsu, Masaki Ogawa, Jin Nakazawa, Kazunori Takashio, Hideyuki Tokuda, Object Recognition using acceleration for Augment Reality, IPSJ SIG Technical Reports, 1-7page, vol. 2009-UBI-24, No. 11, Information Processing Society of Japan.

*Primary Examiner* — Xiao Wu
*Assistant Examiner* — Yu Chen
(74) *Attorney, Agent, or Firm* — Hawaii Patent Services; Nathaniel K. Fedde; Kenton N. Fedde

(57) ABSTRACT

Provided is an article information providing apparatus that includes a display circuit, an imaging circuit, an object recognizing circuit, and an article discriminating circuit. The display circuit displays an article information image in which article information is shown. The imaging circuit images real space. The object recognizing circuit recognizes the object imaged by the imaging circuit. The article discriminating circuit discriminates the article from the object recognized by the object recognizing circuit and displays the article information image on the display circuit based on the state of the discriminated article. In addition, the article discriminating circuit displays the article information image on the display circuit when a dynamic state change of the discriminated article is identified.

16 Claims, 10 Drawing Sheets

(56) References Cited

U.S. PATENT DOCUMENTS

| | | | | |
|---|---|---|---|---|
| 7,743,348 B2* | 6/2010 | Robbins | G06F 3/0421 | 715/767 |
| 7,991,220 B2* | 8/2011 | Nagai | A63F 3/00643 | 345/633 |
| 9,177,224 B1* | 11/2015 | Heller | G06K 9/52 | |
| 2010/0134611 A1* | 6/2010 | Naruoka | G06K 9/00 | 348/77 |
| 2013/0044912 A1* | 2/2013 | Kulkarni | G06K 9/00671 | 382/103 |
| 2013/0121528 A1 | 5/2013 | Ikenoue et al. | | |
| 2013/0218721 A1* | 8/2013 | Borhan | G06Q 20/322 | 705/26.41 |
| 2014/0028713 A1* | 1/2014 | Keating | G06T 19/006 | 345/633 |
| 2014/0028850 A1* | 1/2014 | Keating | G06T 19/006 | 348/158 |
| 2014/0310056 A1* | 10/2014 | Alapati | G06Q 50/01 | 705/7.28 |
| 2015/0324645 A1* | 11/2015 | Jang | G06F 3/012 | 345/633 |
| 2015/0331576 A1* | 11/2015 | Piya | G06F 3/04815 | 715/850 |
| 2015/0379366 A1* | 12/2015 | Nomura | G06Q 50/28 | 382/203 |
| 2016/0109937 A1* | 4/2016 | Kim | G02B 27/01 | 345/156 |
| 2016/0109957 A1* | 4/2016 | Takashima | G06F 1/163 | 345/8 |

FOREIGN PATENT DOCUMENTS

| | | |
|---|---|---|
| JP | 2013-236282 A | 11/2013 |
| JP | 2015-135645 A | 7/2015 |
| WO | WO2012106366 A | 8/2012 |

* cited by examiner

ARTICLE INFORMATION PROVIDING APPARATUS THAT PROVIDES INFORMATION OF ARTICLE, ARTICLE INFORMATION PROVIDING SYSTEM, AND ARTICLE INFORMATION PROVISION METHOD

INCORPORATION BY REFERENCE

This application is based on and claims the benefit of priority from Japanese Patent Application No. 2014-108117 filed on May 26, 2014, and Japanese Patent Application No. 2014-197831 filed on Sep. 29, 2014, the contents of which are hereby incorporated by reference.

BACKGROUND

The present disclosure is related with an article information providing apparatus that provides information of an article, an article information providing system, and an article information provision method.

A technology so called AR (Augmented Reality: extended actual feeling) displays an image of a virtual body on a display part as if the virtual body is in real space. In recent years, AR technology is applied in various fields.

In a typical article information providing system, an article information about an article, such as a good currently displayed at a store, is provided in real time to a person who wants to confirm the article information, such as a customer, for example. This technology images real space by an imaging part. Then, the article information about the article included in the photographed image, which is imaged by the imaging part, is acquired by the article information acquiring part. Then, based on a position of the article included in the image, which is imaged by the imaging part, an extended real image for superimposing and showing the article information acquired by the article information acquiring part on real space is generated by the image generation part. Then, the extended real image generated by the image generation part can be displayed on a display part.

SUMMARY

An article information providing apparatus according to an embodiment of the present disclosure includes a display circuit, an imaging circuit, an object recognizing circuit, and an article discriminating circuit. The display circuit displays an article information image showing article information. The imaging circuit images real space. The object recognizing circuit recognizes an object imaged by the imaging circuit. The article discriminating circuit discriminates an article from the object recognized by the object recognizing circuit and displays the article information image on the display circuit based on a state of the discriminated article.

An article information providing system according to the embodiment of the present disclosure has an article information providing apparatus and an information management server. The article information providing apparatus includes a display circuit, a first information communicating circuit, an imaging circuit, an object recognizing circuit, and an article discriminating circuit. The display circuit displays an article information image showing article information. The first information communicating circuit transmits and receives information to the information management server. The imaging circuit images real space. The object recognizing circuit recognizes an object imaged by the imaging circuit. The article discriminating circuit discriminates an article from the object recognized by the object recognizing circuit, transmits article identification information showing the discriminated article to the information management server via the first information communicating circuit, receives article information of the article from the information management server, and displays on the display circuit the article information image based on a state of the discriminated article. The information management server includes second information communicating circuit, article identifying circuit, and article information acquiring circuit. The second information communicating circuit transmits and receives information between a database registering the article information and the article information providing apparatus. The article identifying circuit identifies the article based on the article identification information. The article information acquiring circuit acquires corresponding article information from the database based on the identified result of the article by the article identifying circuit and transmits to the article information providing apparatus via the second information communicating circuit.

An article information provision method according to the embodiment of the present disclosure is an article information provision method executed by article information providing apparatus. The Article provision method, (i) displays the article information image showing article information via a display circuit; (ii) images real space via an imaging circuit; (iii) recognizes the imaged object via an object recognizing circuit; (iv) discriminates an article from the recognized object via an article discriminating circuit; and (v) displays the article information image on the display circuit based on a state of the discriminated article via the article discriminating circuit.

Figure 1:
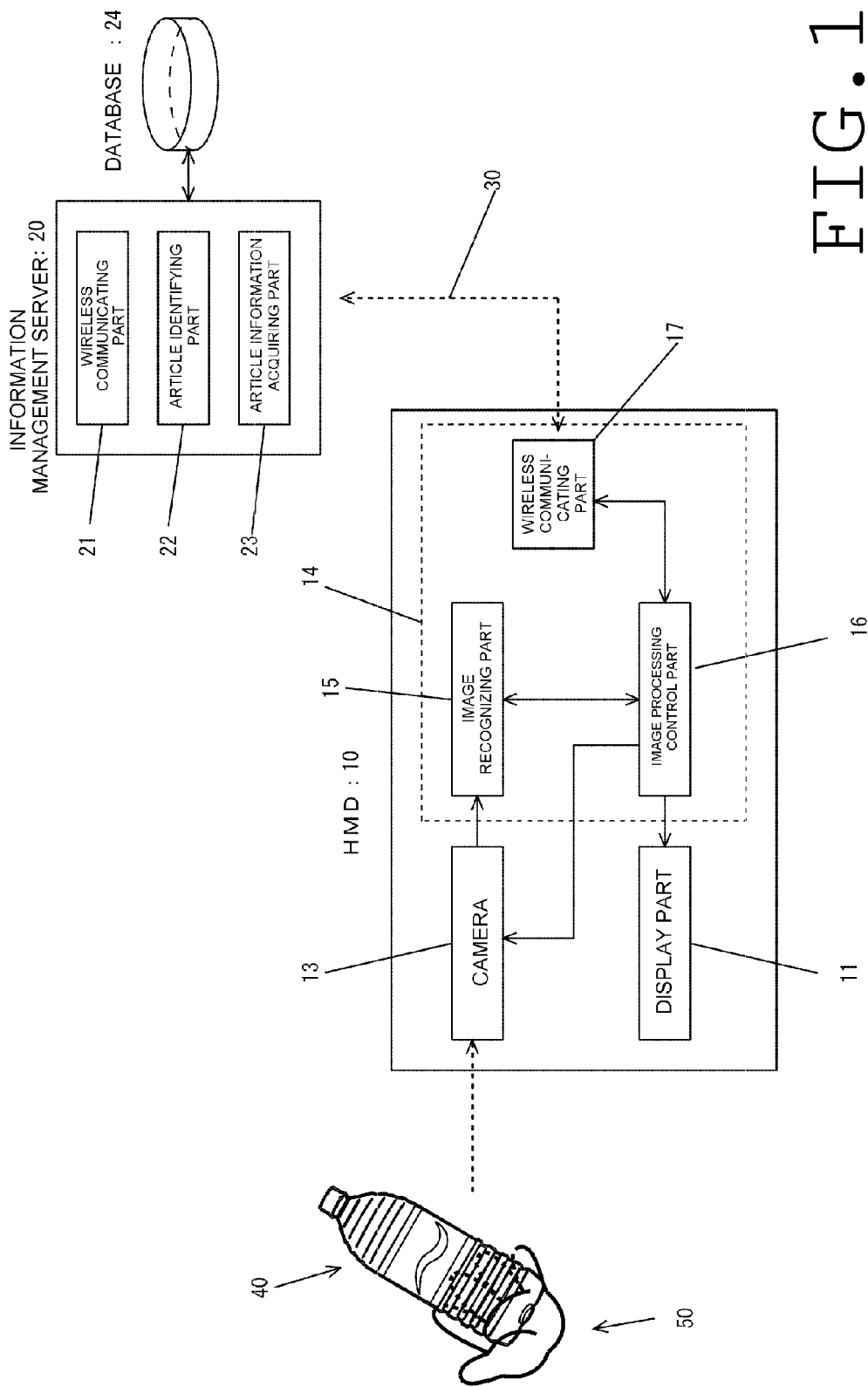
FIG. 1 illustrates a first embodiment of an article information providing system of the present disclosure.
Figure 3:
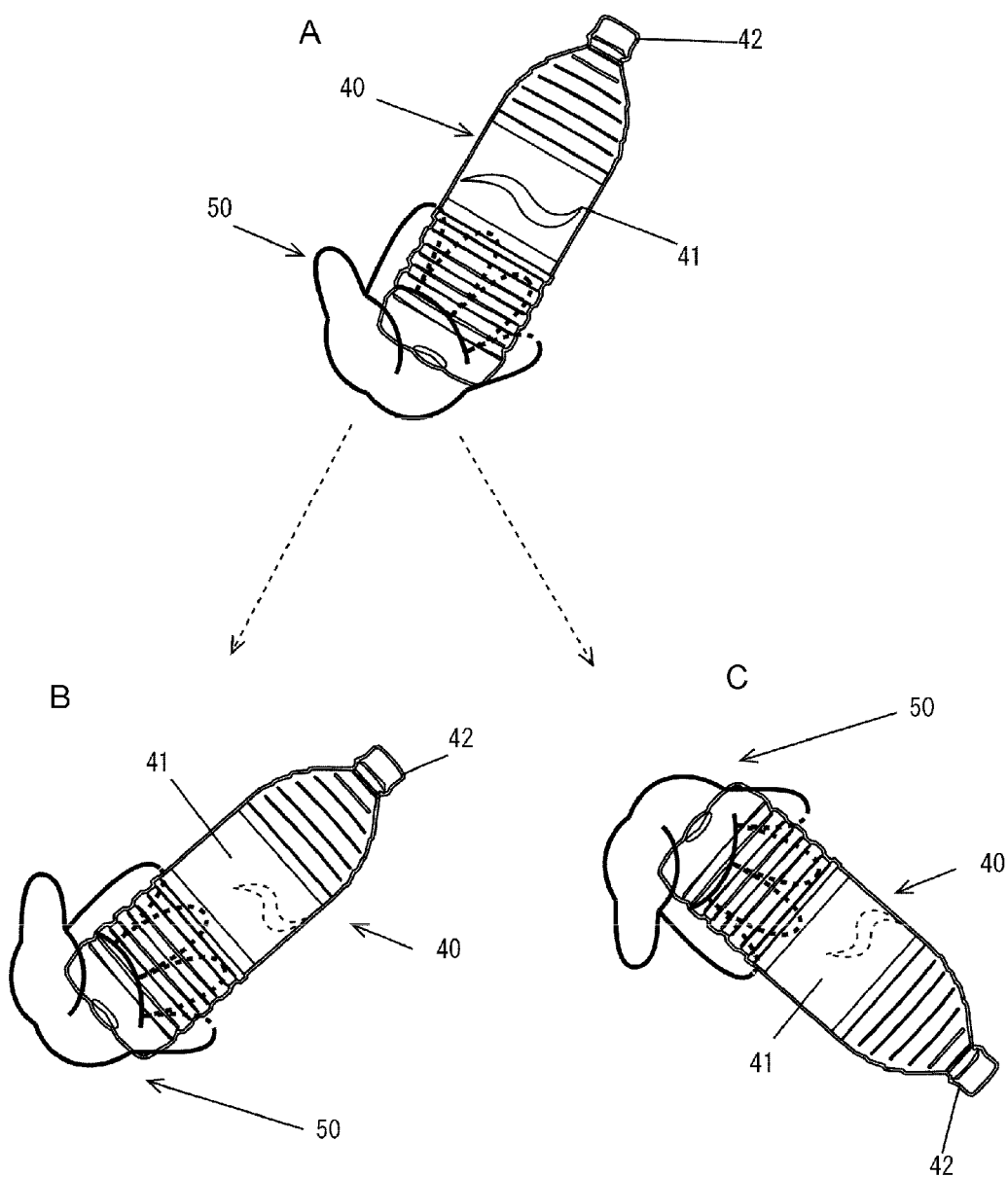
FIG. 3 illustrates states of an article imaged by a camera of HMD in FIG. 1 and held with the hand of the user of HMD.
Figure 4:
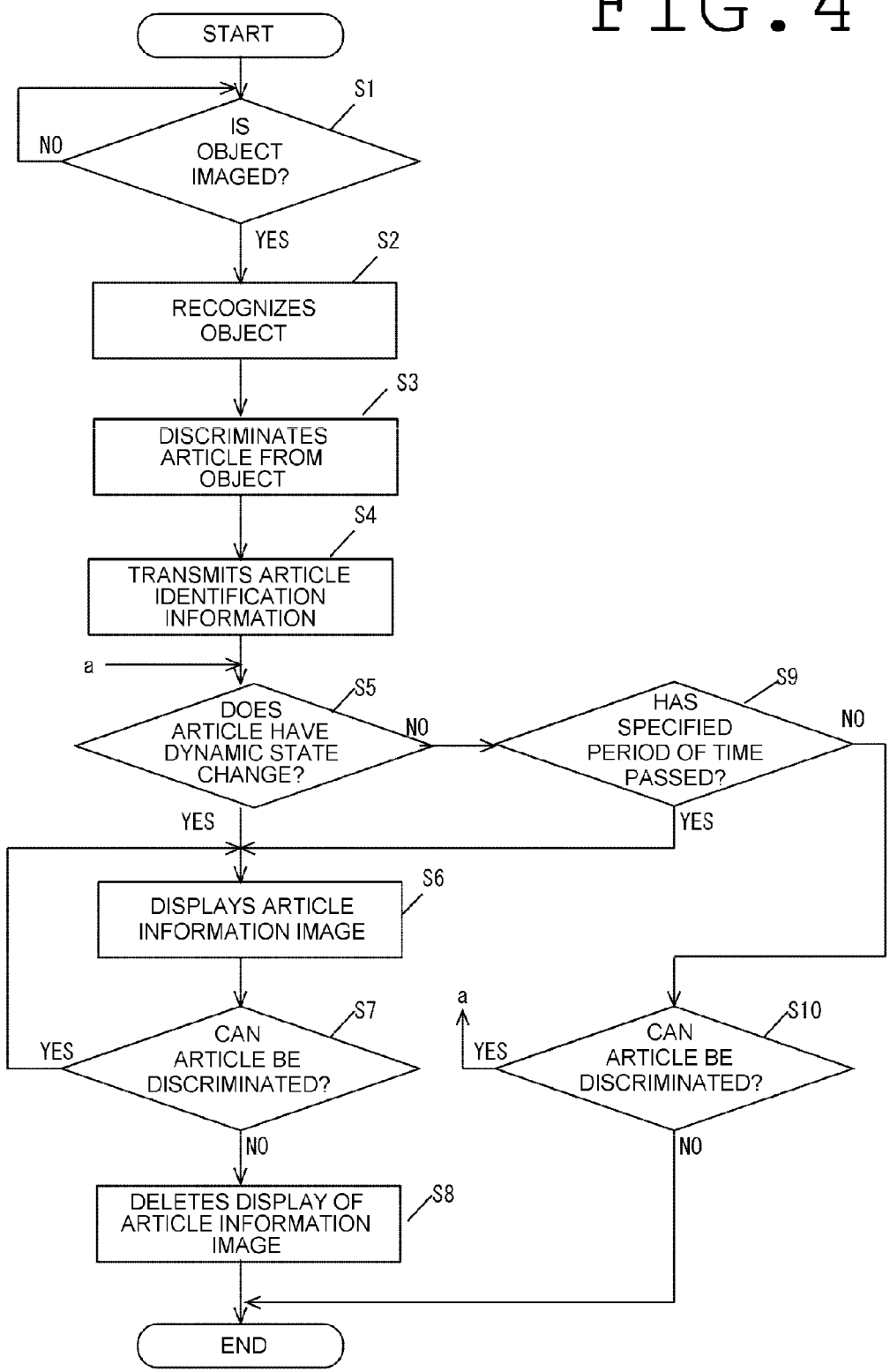
Figure 5:
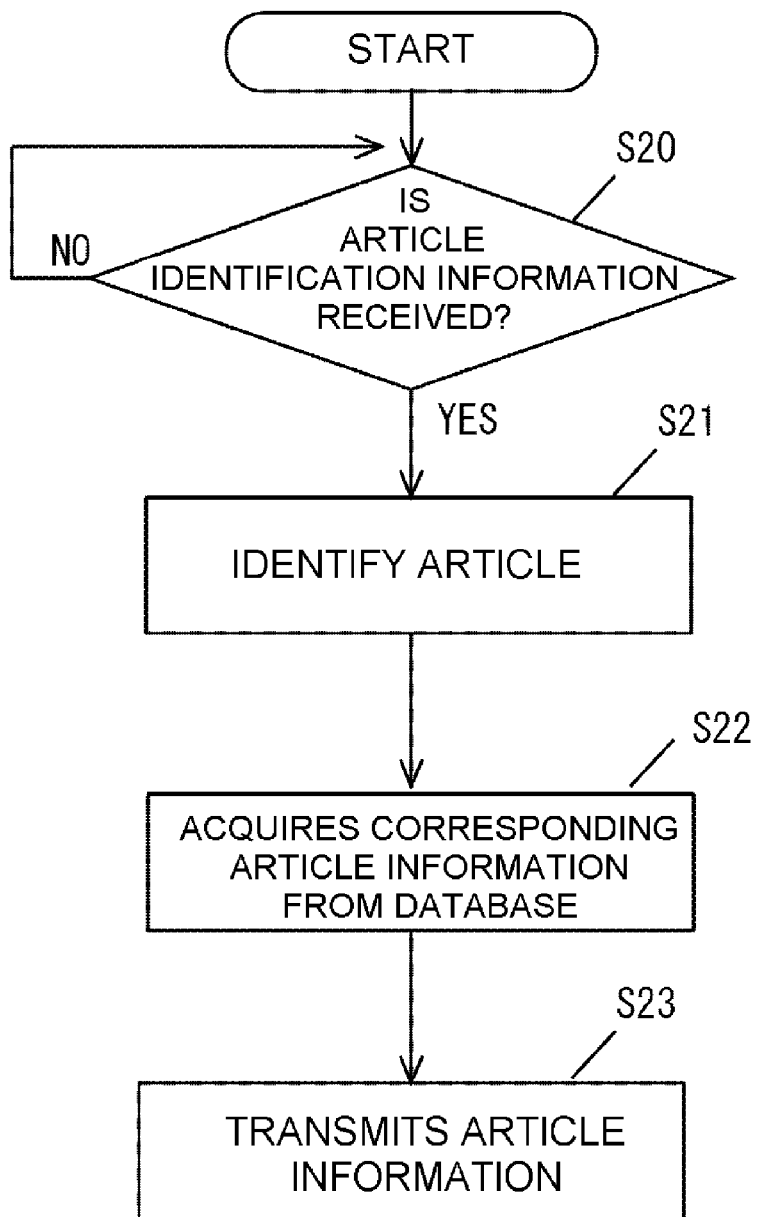
Figure 6:
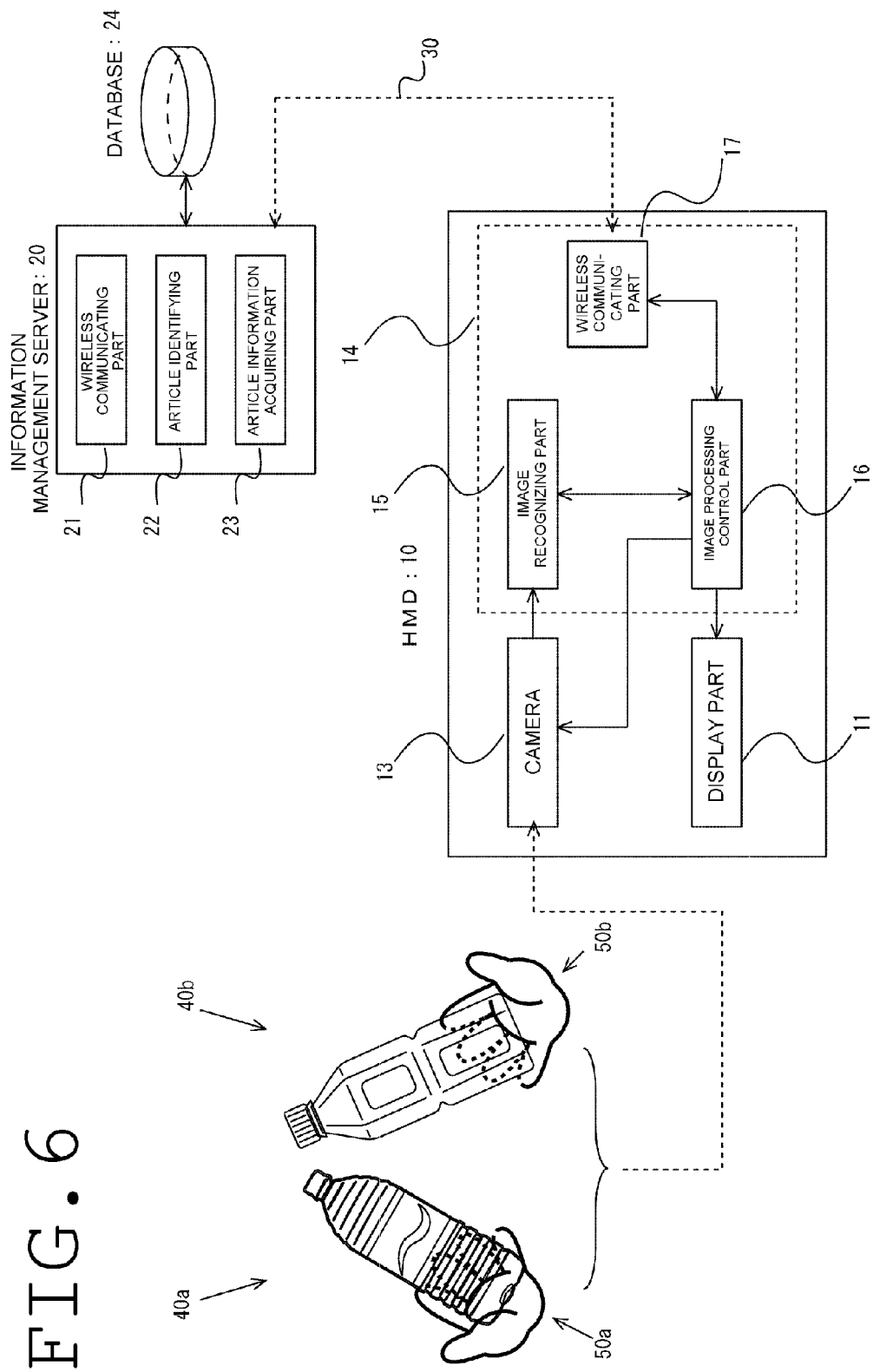
Figure 7:
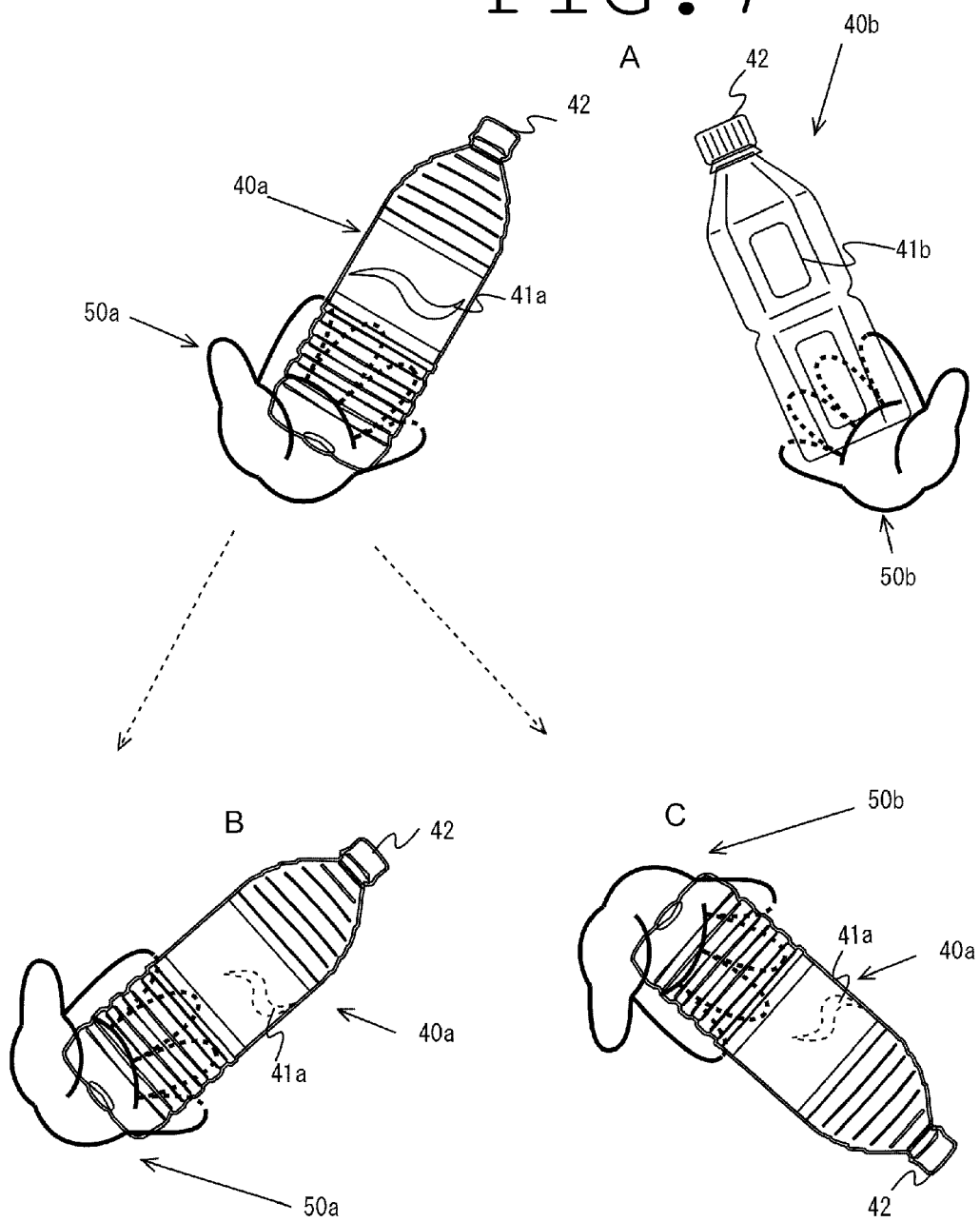

State A of FIG. 3 illustrates a state where an article that is an object imaged by a camera of HMD in FIG. 1 is held with a hand of a user of HMD;

State B of FIG. 3 illustrates a state where the article that is the object imaged by the camera of HMD in FIG. 1 is held with the hand of the user is turned over;

State C of FIG. 3 illustrates a state where the article that is the object imaged by the camera of HMD in FIG. 1 is held with the hand of the user is leaned;

FIG. 4 illustrates the steps of the processing by a side of HMD in FIG. 1;

FIG. 5 illustrates the steps of the processing by a side of the information management server in FIG. 1;

FIG. 6 illustrates a second embodiment of the article information providing system of the present disclosure;

FIG. 7 illustrates states of an article imaged by a camera of HMD in FIG. 6 and held with the hand of the user of HMD.

Figure 2:
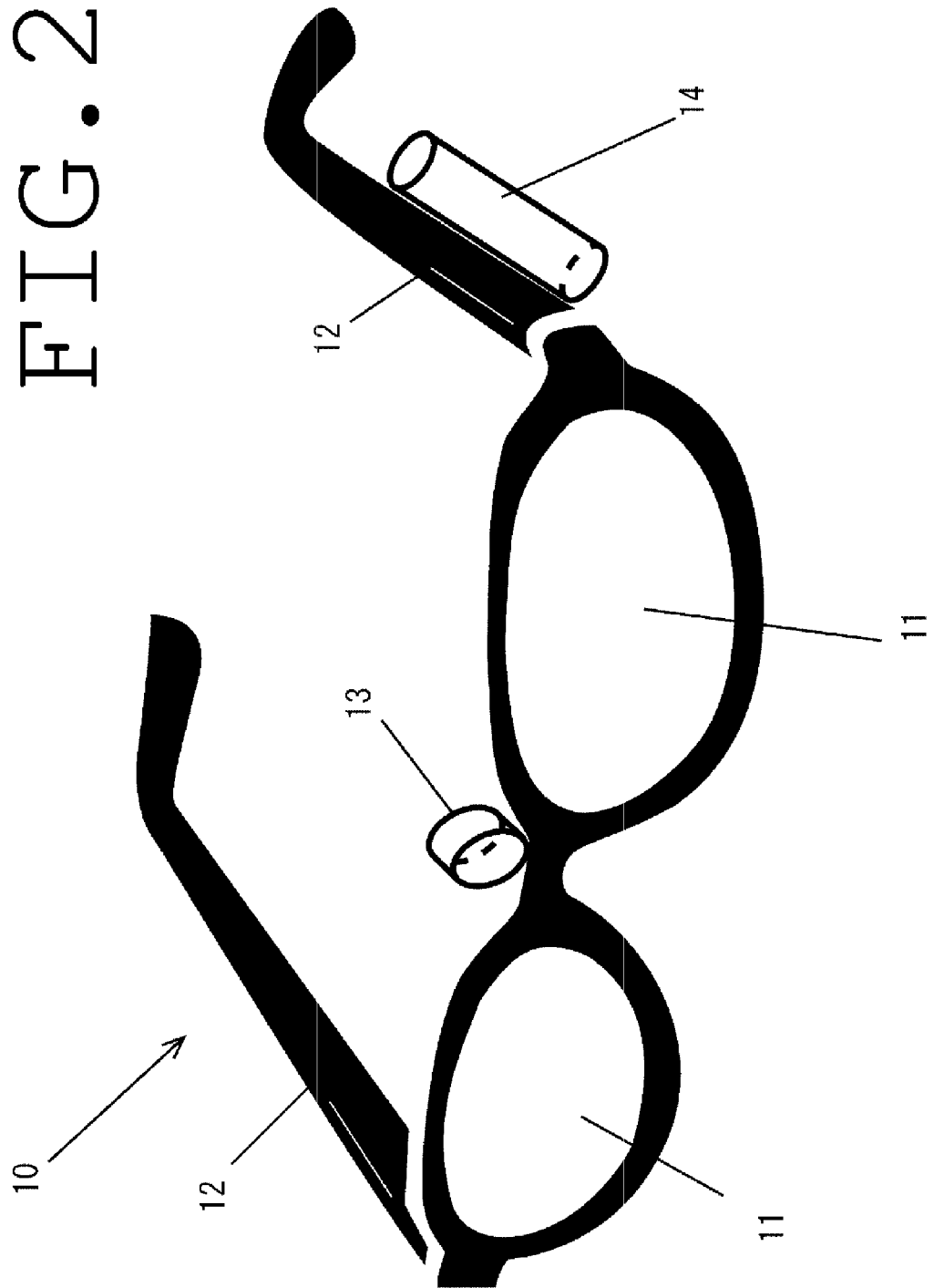
FIG. 2 illustrates an example of HMD in FIG. 1.
Figure 8:
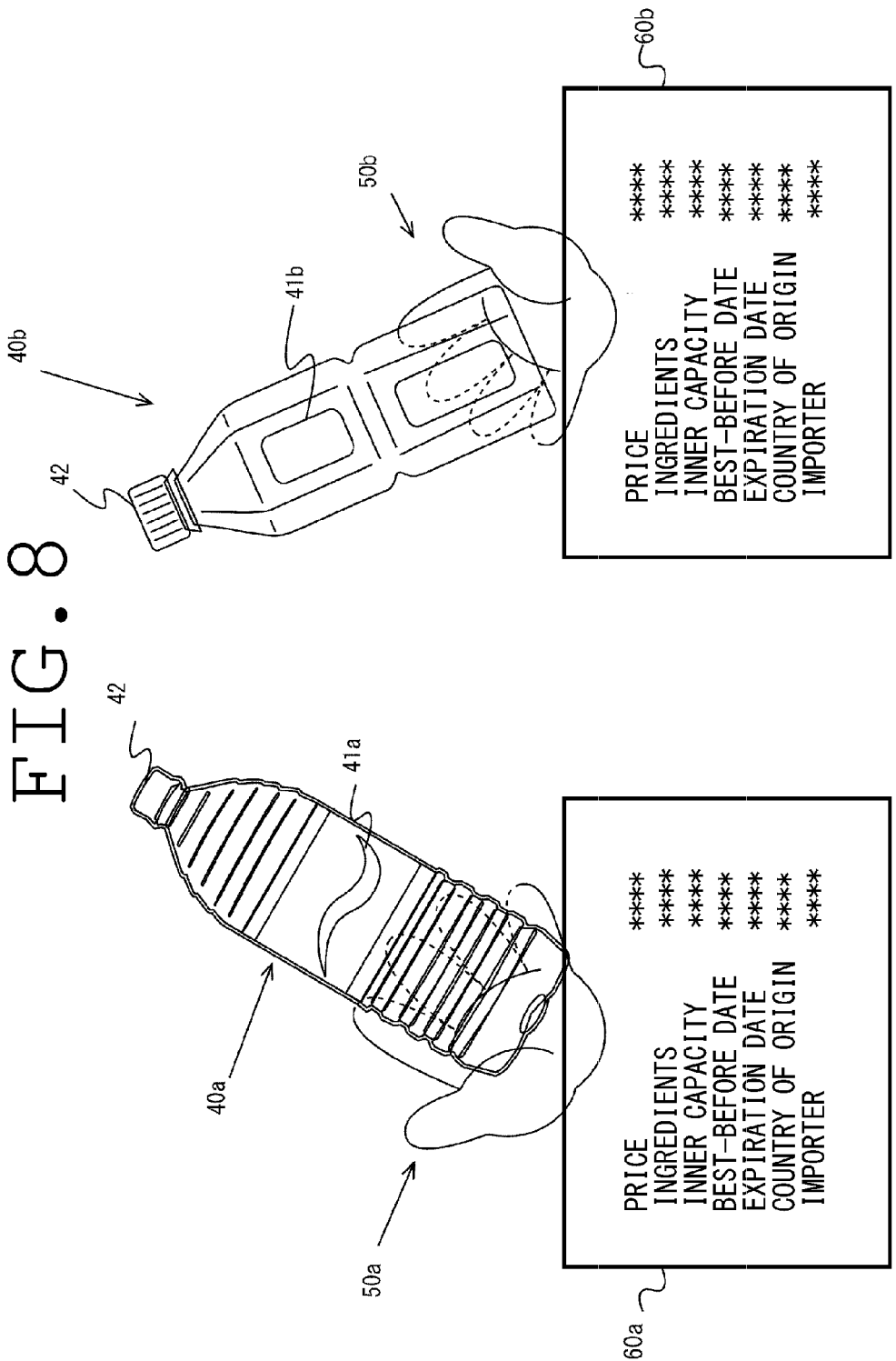
Figure 9:
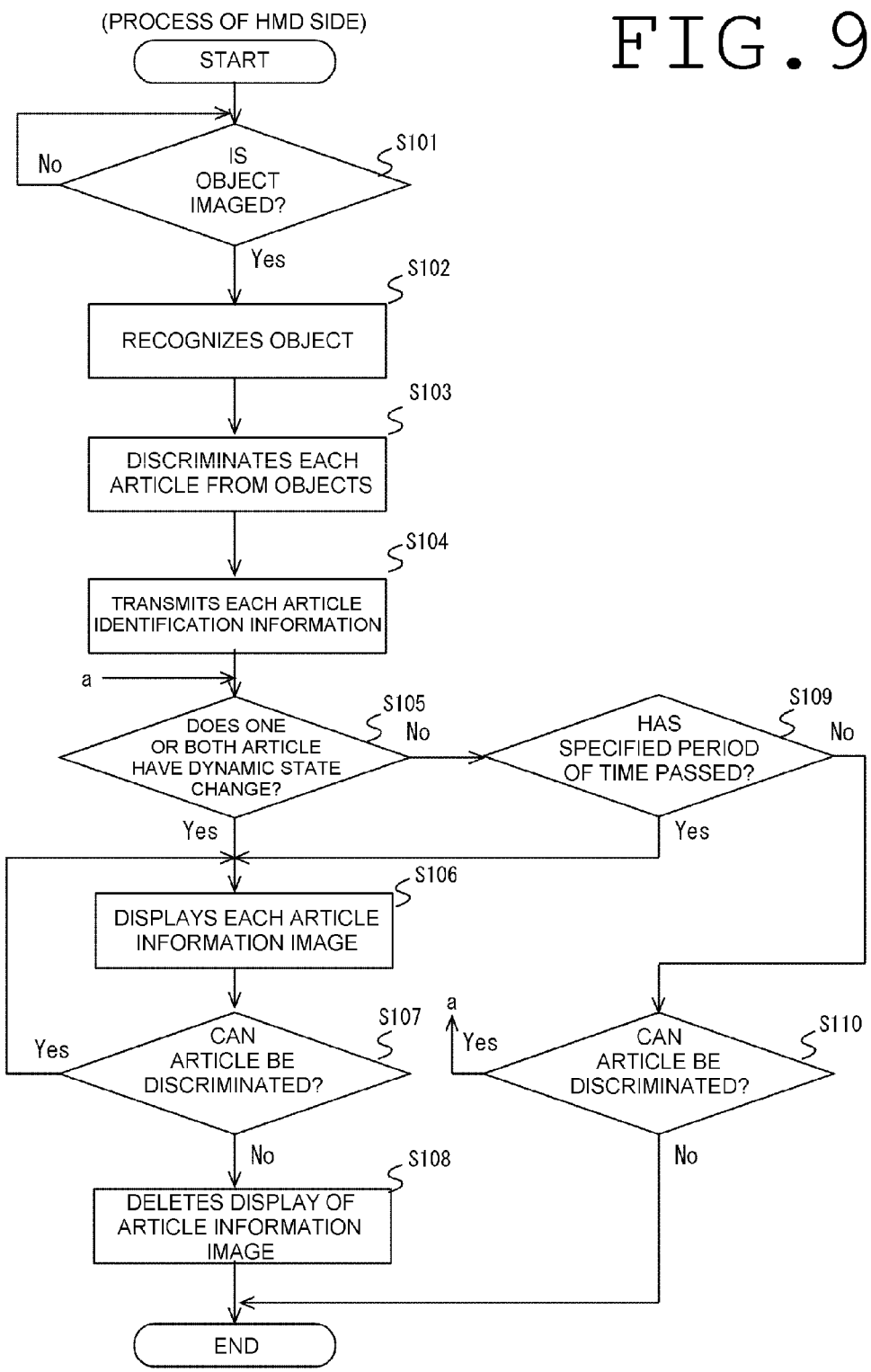
Figure 10:
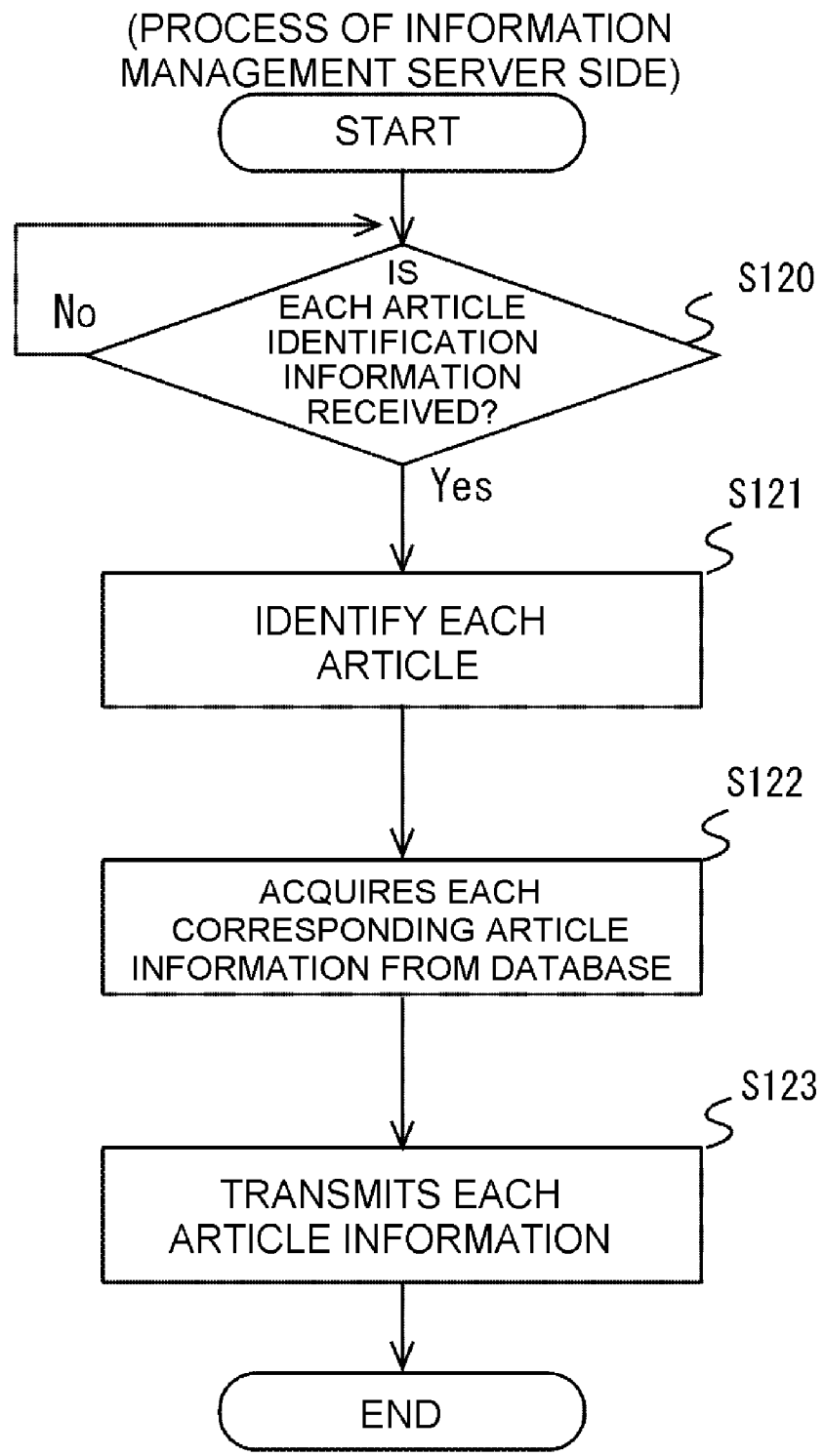

State A of FIG. 7 illustrates a state where the article that is an object imaged by the camera of HMD in FIG. 6 is held with the hand of the user of HMD;

State B of FIG. 7 illustrates a state where the article that is the object imaged by the camera of HMD in FIG. 6 is held with the left hand of the user is turned over;

State C of FIG. 7 illustrates the state where the article that is the object imaged by the camera of HMD in FIG. 6 is held with the left hand of the user is leaned;

FIG. 8 illustrates a display example of article information image in the display part of HMD in FIG. 6 and FIG. 2;

FIG. 9 illustrates the steps of the processing by the side of HMD in FIG. 6 and FIG. 2; and FIG. 10 illustrates the steps of the processing by the side of the information management server in FIG. 6.

DETAILED DESCRIPTION

First Embodiment

In the typical article information providing system as mentioned above, the article information about the article included in the image imaged by the imaging part is acquired by the article information acquiring part. In the case, the position of the article included in the image imaged by the imaging part is acquired by the image generation part. Then, the article information image showing the article information acquired by the article information acquiring part is overlapped on real space and is displayed by the display part. Therefore, the article information about the article currently displayed at the store can be provided in real time to a customer, or the like.

Incidentally, in such an article information providing system, when a customer, or the like, points at or have held the article, the article information image showing article information is displayed, immediately. In this case, since fingers are included in the imaged image, it is determined that the customer, or the like, hopes to know article information. However, for a customer, or the like, to point at or to hold the article may not be an act that hopes to know the article information. That is, while looking for various articles, he or she sometimes just only touches an article.

Thus, even in case of a customer or the like just only touching the article, an excessive article information image is displayed as if the article information image in which article information is illustrated is shown. The user will feel troublesome when an excessive article information image comes into a visual field.

Thus, development of an apparatus that can show in suitable timing the article information image showing the article information that the customer, or the like, who is a user, wants to know is desired.

The present disclosure is accomplished in view of such a situation. The present disclosure provides an article information providing apparatus, an article information providing system, and an article information provision method that the article information image showing the article information that a user wants to know can be shown in suitable timing.

Hereinafter, the first embodiment of the article information providing system of the present disclosure is described, referring to FIG. 1-FIG. 5. An example of the article information providing apparatus in the following explanation is a HMD (Head Mounted Display), or the like. Also, the head mounted display explained below is used, for example, at a store.

At first, as shown in FIG. 1, the article information providing system includes HMD 10 and information management server 20 having database 24. HMD 10 and information management server 20 are connected via wireless communications lines 30.

HMD 10 is a circuit that superimpose-displays an article in real space and an article information image rendered the article information by CG, or the like. HMD 10 is a form of the article information providing apparatus that provides article information in real time to a user. Also, for example, HMD 10 is used as mounted on the head of the user. For example, HMD 10 is a glass type as shown in FIG. 2. Thereby, the user does not need to keep HMD 10 in hand. Accordingly, shopping can be done by using both hands as has been the way.

HMD 10 has right and left display part 11 and temple part 12. Display part 11 displays the article information image. Temple part 12 is a member for hanging on a near. Camera 13 is arranged between right and left display parts 11. By camera 13 being arranged between right and left display parts 11, an imaging range of camera 13 follows a motion of the head of the user. Also, apparatus main body 14 is arranged at one temple part 12.

In addition, photo sensors are used for camera 13 as an image sensor, for example. Also, camera 13 is a video camera that can image an object having an imaging cycle per image, for example, in 1/30 second. In this case, the frame rate is 30 fps.

Thereby, camera 13 can continuously image hand 50 for the user, which is an object, and article 40 currently held with hand 50 for the user. In addition, camera 13 is not limited to a video camera. Camera 13 may also be a device imaging a still picture. In this case, it is possible to have an imaging interval of the still picture to 0.5 second, for example. Thereby, hand 50 for the user, which is an object, and article 40 currently held with hand 50 for the user can be imaged, intermittently.

Display part 11 is a circuit that displays an image, and is, for example, the optical see-through type is used. That is, display part 11 can be penetrated visible light. Thereby, the person mounting HMD 10 can directly look at spectacle of real space, which penetrates display part 11 in sight and also can look at an extended real image displayed on display part 11. The extended real image in this case is the article information image in which the article information rendered by CG, or the like, is shown.

In addition, display part 11 may be configured as a half mirror, for example. Also, display part 11 has a projection device for projecting the article information image in which article information is shown on display part 11. The article information is generated by the after-mentioned image processing control part 16. Also, display part 11 may be configured as a liquid crystal display. In this case, an article information image is displayed on display part 11 by the liquid crystal drive circuit. Article information is also generated by the after-mentioned image processing control part 16 in the case.

Apparatus main bodies 14 a circuit that has a processor, a memory, and an interface. Apparatus main body 14 includes image recognizing part 15, image processing control part 16, and wireless communicating part 17. Image recognizing part 15 is a circuit that recognizes article 40. Article 40 is an object imaged by the above-mentioned camera 13. In this case, when the user is holding article 40, a hand 50 for the user is also be recognized as the object. Also, when it images in a state where article 40 is displayed on a shelf, image recognizing part 15 recognizes article 40 and the shelf as the object.

Recognition of the object by image recognizing part 15 is continuously performed while imaging is performed by camera 13. In addition, recognition of the object by image recognizing part 15 may be intermittently performed as it was considered, for example, as the 0.5-second interval.

Image processing control part 16 is a circuit that controls recognition operation by image recognizing part 15. Also, image processing control part 16 discriminates article 40 from the object recognized by image recognizing part 15. Also, image processing control part 16 transmits an article identification information that shows article 40 to information management server 20 via wireless communicating part 17. Information management server 20 is connected to wireless communications lines 30. In addition, article identification information may be an article image of article 40. Also, article identification information may be a name of article, a bar code, a lot number, a date of manufacture, a manufacturer name, or the like, which is attached on article 40. That is, article identification information that enables discrimination of article 40, independently or with combination.

Also, image processing control part 16 determines whether or not the user wants to know article information as like after-mentioned. When determining that a user wants to know the article information, Image processing control part 16 generates the article information image showing the article information and displays on display part 11. The article information is information received from information management server 20.

Here, the decision whether or not the user wants to know the article information by image processing control part 16 is carried out, for example, by determining whether or not article 40 is moved by hand 50 for the user. That is, for example, as shown in FIG. 3 state A, it is assumed that article 40 is held with hand 50 for the user. In this case, in a state where mark 41 is positioned in front of article 40, article 40 currently held with hand 50 for the user is imaged by camera 13. In addition, numeral 42 in the figure shows a cap.

Also, for example, as shown in FIG. 3 state B, the user may turn over article 40 that is held with hand 50, and he or she may be looked at the entire article 40, an explanation writing on article 40, or the like. In this case, in a state where mark 41 of article 40 is moved to the back side, article 40 currently held with hand 50 for the user is imaged by camera 13.

Also, as shown in FIG. 3 state C, the user may lean article 40 that is held with hand 50, and he or she may be looked at the entire article 40, explanation writing on article 40, or the like. In this case, in the state where cap 42 of article 40 is moved below, article 40 currently held with hand 50 for the user is imaged by camera 13.

Such dynamic state change of article 40 can be discriminated by image processing control part 16. Image processing control part 16 discriminates article 40 from the object recognized by image recognizing part 15. In addition, image processing control part 16 identifies change of article 40. Thereby, image processing control part 16 identifies dynamic state change of article 40 by article 40 turning over or being leaned. As a result, it can be determined whether or not the user wants to know the article information.

Then, image processing control part 16, when determining certainly as the user wants to know the article information, generates the article information image showing the article information based on the article information from information management server 20. Image processing control part 16 displays the article information image on display part 11. Thereby, in timing considered that the user wants to know the article information of article 40, article information of the article 40 can be provided for the user.

In addition, the decision whether or not the user wants to know the article information by image processing control part 16 does not limit to the presence or absence for dynamic state change of article 40. That is, article 40 in the state, for example, shown in FIG. 3 state A may be imaged, continuously. This is, although the user holds article 40 by hand 50, the entire article 40 may be looked at in the state as it is, or explanation writing on article 40, or the like, may be looked at.

In this case, when a state where there is no dynamic state change of article 40 is kept for a specified period of time (for example, about 5 seconds), the user stares at article 40. In this case, image processing control part 16 determines that the user wanting to know the article information. In addition, the specified period of time that needs for a decision is not limit in 5 seconds and can be changed, suitably. Also, the user may stare at article 40 currently displayed on the shelf without holding. In this case, when the state where there is no dynamic state change of article 40 is kept for a specified period of time (for example, about 5 seconds), it determines that the user wants to know the article information.

Wireless communicating part 17 is a circuit that transmits the article identification information from image processing control part 16 to information management server 20 and receives the article information from information management server 20.

On the other hand, information management server 20 is a circuit that has a processor, a memory, and an interface. Information management server 20 includes wireless communicating part 21, article identifying part 22, and article information acquiring part 23. Wireless communicating part 21 is a circuit that receives the article identification information from HMD 10, as mentioned above, and transmits the article information corresponding to the article identification information.

Article identifying part 22 is a circuit that identifies article 40 based on the article identification information from HMD 10. In case that the article identification information is the article image of article 40, distinction of article 40 is performed by collation with the article image registered in database 24. Also, in case that the article identification information is the name of article attached on article 40, collation with the name of article registered in database 24 is performed. In addition, in case that the article identification information is a bar code, it reads as it is. Accordingly, article 40 is discriminated.

Article information acquiring part 23 is a circuit that acquires the article information corresponding from database 24 based on the identified result of article 40 by article identifying part 22. In database 24, the article information corresponded to each article 40 and the article image and name of article for discriminating article 40 are registered. Database 24 is a circuit including storage devices, such as Hard Disk Drive, and may be included in information management server 20.

Then, with reference to FIG. 4, a processing by the side of HMD 10 is explained. In the processing by the side of HMD 10, when HMD 10 is mounted on the head of the user, imaging by camera 13 is started.

At first, since a state of waiting for imaging of an object by camera 13 in HMD 10 (Step S1: NO), imaging of an object by camera 13 in HMD 10 is performed (Step S1: YES). Here, for example, as shown in FIG. 3 state A, article 40 is held with hand 50 for the user. At this time, camera 13 in HMD 10 images article 40, which is the object, and hand 50 for the user.

When the object is imaged, image recognizing part 15 recognizes article 40, which is the object, and hand 50 for the user (Step S2). As mentioned above, for example, camera 13 is a video camera, and the imaging cycle per image is, for example, 1/30 second. That is, the frame rate is 30 fps. In this case, image recognizing part 15 recognizes article 40, which is the object, and a hand 50 for the user from arbitrary frame images in 30 frame images obtained in one second, for example.

Next, image processing control part 16 discriminates article 40 recognized by image recognizing part 15 (Step S3). Image processing control part 16 transmits the article identification information that shows the discriminated article 40 to information management server 20 via wireless communicating part 17 (Step S4). Information management server 20 is connected to wireless communications lines 30.

In addition, the article identification information that shows the article 40 may be the article image of article 40, as mentioned above. Also, article identification information may be the name of article, the bar code, or the like, which is attached on article 40. Also, when article identification information is transmitted from HMD 10 to information management server 20, corresponding article information is replied from information management server 20, immediately. This processing is described later. Accordingly, here, corresponding article information is replied from information management server 20.

Also, imaging of the object by camera 13 is continuously performed. Therefore, based on recognition of the object by image recognizing part 15, image processing control part 16 determines the presence or absence of dynamic state change of article 40 (Step S5).

Here, for example, as shown in FIG. 3 state B, suppose that the user turns over article 40 held with hand 50, looks at the entire article 40, the explanation writing on article 40, or the like. In this case, as mentioned above, article 40 currently held with the hand 50 for the user is imaged by camera 13 in the state where mark 41 of article 40 is moved to the back side.

Also, as shown in FIG. 3 state C, suppose that the user leans article 40 held with hand 50, looks at the entire article 40, the explanation writing on article 40, or the like. In this case, as mentioned above, article 40 currently held with the hand 50 for the user is imaged by camera 13 in the state where cap 42 of article 40 is moving below.

Such dynamic state change of article 40, can be discriminated by image processing control part 16 discriminating article 40 from the object recognized by image recognizing part 15 and by identifying change of article 40. Then, if image processing control part 16 determines that article 40 has dynamic state change (Step S5: YES), it determines that the user wants to know the article information. Then, image processing control part 16 generates the article information image showing the article information received from information management server 20 and displays it on display part 11 (Step S6). Thereby, the article information is provided to the suitable timing as considered that the user wants to know the article information.

Next, image processing control part 16 determines whether or not article 40 that is the object recognized by image recognizing part 15 can be discriminated (Step S7). That is, image processing control part 16 can discriminate article 40 from the recognition result by image recognizing part 15 while article 40, which the user is held with hand 50, is imaged by camera 13. On the other hand, when article 40 is returned to its shelf, it is aside away an imaging range for camera 13. Thereby, distinction of article 40 from the recognition result by image recognizing part 15 is not possible.

Therefore, if image processing control part 16 can performs distinction of article 40 (Step S7: YES), the display of the article information image showing the article information on display part 11 is continued. On the other hand, if image processing control part 16 cannot discriminate article 40 (Step S7: NO), the display of the article information image showing article information is deleted (Step S8). Thereby, it prevents the excessive article information image comes into a visual field.

On the other hand, in Step S5, if there is no dynamic state change in article 40 (Step S5: NO), image processing control part 16 determines whether or not keeping for a specified period of time (for example, about 5 seconds) (Step S9). Namely, in the state, for example, as shown in FIG. 3 state A, article 40 may continue to be imaged by camera 13. As mentioned above, this is because the user looked at the entire article 40 or explanation writing on article 40, or the like, in the state without moving article 40 held with hand 50 and as it is.

In this case, image processing control part 16, if determining the state where there is no dynamic state change of article 40 has passed a specified period of time (for example, about 5 seconds) (Step S9: YES), infers that the user wants to know the article information. Image processing control part 16 generates the article information image showing the article information received from information management server 20 and displays it on display part 11 (Step S6). In addition, as mentioned above, a user may stare at article 40 currently displayed on the shelf as it is without holding. Also in this case, image processing control part 16, if it has passed for a specified period of time (for example, about 5 seconds), determines that the user wants to know the article information. Thereby, article information is provided to the suitable timing considered that the user wants to know article information as a similar situation as the above.

On the other hand, image processing control part 16, if determining that the state where there is no dynamic state change of article 40 is not kept for the specific period of time (for example, about 5 seconds) (Step S9: NO), determines whether or not article 40, which is an object recognized by image recognizing part 15, can be discriminated (Step S10). Image processing control part 16, if article 40 can be discriminated (Step S10: YES), determines whether or not article 40 has dynamic state change (Step S5).

On the other hand, if image processing control part 16 cannot discriminate article 40 (Step S10: NO), the display of the article information image showing the article information by display part 11 is not performed. That is, as mentioned above, while article 40 in which the user is held with hand 50 is imaged by camera 13, image processing control part 16 can discriminate article 40 from the recognition result by image recognizing part 15.

On the other hand, although the user has once held article 40, article 40 may be immediately returned to its shelf. Also, as mentioned above, the user may stare at article 40 currently displayed on the shelf without holding and as it is. However, in a short time, a line of sight may be averted from article 40, which is stared at. Also, although the user has once held article 40, he or she may put into a basket as it is.

In this case, as mentioned above, when article 40 is away from the imaging range of camera 13, image processing control part 16 cannot perform distinction of article 40 from the recognition result by image recognizing part 15. Therefore, image processing control part 16 does not determine whether or not the user wants to know the article information when the distinction of article 40 becomes impossible in a short time. Thereby, if the user does not think to want to know the article information, the article information image showing article information is not displayed on display part 11. Accordingly, the display of the excessive article information image is avoidable.

Then, with reference to FIG. 5, a processing by the side of information management server 20 is explained. At first, it becomes the reception waiting of the article identification information from HMD 10 side (Step S20: NO). If wireless communicating part 21 receives the article identification information from HMD 10 side (Step S20: YES), article identifying part 22 identifies article 40 based on the article identification information (Step S21).

Here, as mentioned above, if the article identification information is the article image of article 40, identification of article 40 is performed by collation with the article image registered into database 24. Also, if article identification information is the name of article attached on article 40, collation with the name of article registered in database 24 is performed. In addition, if article identification information is the bar code, it reads as it is and discriminates article 40.

Next, article information acquiring part 23 acquires article information corresponding from database 24 based on the identified result by article identifying part 22 (Step S22). Then, when article information is acquired by article information acquiring part 23, wireless communicating part 21 will transmit the acquired article information to HMD 10 side (Step S23).

Thus, in the present embodiment, real space is imaged by camera 13 that is a form of the imaging circuit of HMD 10, which is a form of the article information providing apparatus; the object imaged by camera 13 by image recognizing part 15, which is a form of the object recognition circuit is recognized; if the article is discriminated from the object, which is recognized by image recognizing part 15, by image processing control part 16, which is a form of an article discriminating circuit; and the article identification information that shows the discriminated article is transmitted to information management server 20 via wireless communicating part 17, which is a form of the first information communicating circuit. Also, if the article information of the article from wireless communicating part 21, which is a form of the first information communicating circuit of information management server 20, is received, by image processing control part 16, based on the state of the discriminated article, the article information image showing article information is displayed on display part 11.

In addition, on the side of information management server 20, if the article is identified by article identifying part 22 based on the article identification information, based on the identified result of the article by article identifying part 22, corresponding article information is acquired from database 24 with which article information is registered by article information acquiring part 23. Then, it is transmitted to HMD 10 via wireless communicating part 21 that is a form of the second information communicating circuit.

Thus, with cooperating information management server 20, based on the state of the article discriminated by image processing control part 16 of HMD 10, the article information image showing article information is displayed on display part 11. Accordingly, the article information image showing the article information that the user wants to know can be shown with suitable timing.

When it explains in detail, based on the article information providing apparatus, the article information providing system, the article information provision method, and the article information distribution program of the present disclosure, an article is discriminated by the article discriminating circuit from an object recognized by the object recognizing circuit. In that case, the article information image showing article information on the display part based on the state of the discriminated article is displayed. Therefore, the article information image showing the article information that a user wants to know can be shown in suitable timing.

In addition, the display of the article information image showing the article information for display part 11 by image processing control part 16 is a case where the dynamic state change of the discriminated article is identified or a case where there is no dynamic state change of the discriminated article for a specified period of time. This is the conditions for determining whether or not the user wants to know the article information. By displaying on display part 11 the article information image showing article information when these conditions are fulfilled, displaying an excessive article information image is avoided. Also, since the excessive article information image may not come into visual field of the user, the user never feels troublesomeness.

Although the present embodiment explained for a case of an article currently displaying on a shelf at a store, the present disclosure can be similarly carried out to an article placed on other place.

Second Embodiment

Then, a second embodiment of the present disclosure is described. In a typical article information providing system can provides an article information about an article currently displayed at a store to a user in real time.

However, the article information provided with such the article information providing system is limited to the article that is put the finger or is held. Therefore, when comparing with the other article, which is similar, it is necessary to face the eye line, to point at, and to hold the other articles. Although the article information image of the other articles is displayed at this time, the display of the article information image displayed previously is not performed. Accordingly, the comparison of the articles is difficult.

That is, there are various types of articles, such as goods displayed at the store. When purchasing any one among these articles, comparing a similar article can be seen. In this case, for example, the article serving as comparison object is held with the right and left hand, and the both articles are compared in many cases. Here, if an article is a processed food, a price, ingredients, net weight, a best-before date, an expiration date, a country of origin, an importer, or the like, are compared in many cases.

However, for example, even if the both article are similar, display places, such as a price, ingredients, net weight, a best-before date, an expiration date, a country of origin, and an importer, are different, the utilizations of the display are different, or the visual confirmations of the content are difficult. Therefore, the comparison of the both articles is extremely troublesome.

In the above circumstance, development of an apparatus that can compare articles, easily, is desired by simultaneously showing the article information images of the articles serving as the comparison objects, which a user wants to know.

Hereinafter, referring to FIG. 6-FIG. 10, a second embodiment of the article information providing system of the present disclosure is described. In addition, an example of the article information providing apparatus in the following explanation is also HMD. Also, a head mounting type display explained in the following is used at a store, for example.

At first, as shown in FIG. 6, the article information providing system includes HMD 10 and information management server 20 having database 24. HMD 10 and information management server 20 are connected via wireless communications lines 30.

HMD 10 superimpose-displays an article in real space and after-mentioned article information images 60a and 60b showing an article information rendered by CG (computer graphics), or the like. HMD 10 is a form of the article information providing apparatus that provides article information in real time to a user. Also, for example, HMD 10 is used as mounted in the head of the user, and, for example, it is a glasses type as shown in FIG. 2.

Namely, HMD 10 is the same as the above-mentioned first embodiment, right and left display part 11 that displays after-mentioned article information images 60a and 60b showing article information and temple part 12 for hanging on the ear. Camera 13 is arranged between right and left display parts 11. Also, apparatus main body 14 is arranged at one temple part 12.

In addition, camera 13 is, for example, as the same as the first embodiment, a video camera that can image an object, which an imaging cycle per image is 1/30 second (that is, a frame rate is 30 fps.)

Thereby, camera 13 can image continuously articles 40a and 40b held with left hand 50a and right hand 50b for the user, which are the objects, and left hand 50a and right hand 50b for the user. In addition, camera 13 is not limited to a video camera, and it may images a still picture. In this case, for example, when an imaging interval of the still picture is 0.5 second, left hand 50a and right hand 50b for the user, which are the objects, and articles 40a and 40b held with left hand 50a and right hand 50b for the user can be imaged, intermittently. In addition, articles 40a and 40b may be the same, may be similar, or may differ on type. In any case, although described later for details, articles 40a and 40b held with left hand 50a and right hand 50b for the user serve as the comparison objects.

Also, for example, the optical see-through method is used for display part 11 as like the first embodiment. The extended real images of the present embodiment are after-mentioned article information images 60a and 60b showing the article information rendered by CG, or the like.

In addition, display part 11 has a projection device for projecting after-mentioned article information images 60a and 60b on display part 11. Also, when display part 11 is configured as a liquid crystal display, article information images 60a and 60b are displayed on display part 11 by the liquid crystal drive circuit.

Apparatus main body 14 includes image recognizing part 15, image processing control part 16, and wireless communicating part 17. Image recognizing part 15 recognizes articles 40a and 40b, which are the objects imaged by above-mentioned camera 13. In this case, when the user is holding articles 40a and 40b, left hand 50a and right hand 50b for the user are also recognized as the objects. Also, when it images in a state where articles 40a and 40b are displayed on the shelf, image recognizing part 15 recognizes articles 40a and 40b and the shelf as the objects.

Recognition of the objects by image recognizing part 15 is continuously performed while imaging is performed by camera 13. In addition, recognition of the objects by image recognizing part 15 may be into a 0.5-second interval, for example, and thus it may be carried out, intermittently.

Image processing control part 16 controls recognition operation by image recognizing part 15. Also, image processing control part 16 discriminates articles 40a and 40b from the object recognized by image recognizing part 15, and the article identification information showing articles 40a and 40b is transmitted to information management server 20 connected to wireless communications lines 30 via wireless communicating part 17. In addition, article identification information may be an article image of articles 40a and 40b. Also, the article identification information may be names of articles, bar codes, lot numbers, dates of manufacture, manufacturer names, or the like, which are attached on articles 40a and 40b. That is, the article identification information may be independent or combination information that enables discrimination of articles 40a and 40b.

Also, image processing control part 16 determines whether or not the user wants to know the article information as like the after-mentioned. If image processing control part 16 determines that the user wants to know the article information, it generates the after-mentioned article information images 60a and 60b showing the article information received from information management server 20 and displays on display part 11.

Here, the decision whether or not the user wants to know the article information by image processing control part 16 is carried out, for example, by determining whether or not article 40a or 40b is moved by left hand 50a or right hand 50b of the user. Here, a similar decision is performed even if a case that articles 40a and 40b are simultaneously moved by left hand 50a and right hand 50b.

That is, for example, as shown in FIG. 7 state A, it is assumed that articles 40a and 40b serving as comparison objects are held with left hand 50a and right hand 50b for the user. In this case, in the state where marks 41a and 41b of articles 40a and 40b are located in front side, articles 40a and 40b held with left hand 50a and right hand 50b for the user are imaged by camera 13. In addition, numeral 42 in the figure show a cap.

Also, for example, as shown in FIG. 7 state B, when article 40a that the user is held with left hand 50a may be turned over, and he or she may be looked at the entire article 40a or explanation writing on article 40a, or the like. In this case, in a state where mark 41a of article 40a is moved to the back side, article 40a held with left hand 50a for the user is imaged by camera 13. In addition, article 40b that the user is held with right hand 50b may be turned over, and he or she may be looked at the entire article 40b or explanation writing on article 40b, or the like. In this case, in the state where mark 41b of article 40b is moved to the back side, article 40b held with right hand 50b for the user is imaged by camera 13.

Also, as shown in FIG. 7 state C, article 40a held with left hand 50a is leaned, and the user may look at the entire article 40a, may look at the explanation writing on article 40a, or the like. In this case, in the state where cap 42 of article 40a is moved below, article 40a held with left hand 50a for the user is imaged by camera 13. In addition, article 40b held with right hand 50b is leaned, and a user may look at the entire article 40b, may look at the explanation writing on article 40b, or the like. In this case, in the state where cap 42 of article 40b is moved below, article 40b held with right hand 50b for the user is imaged by camera 13.

For dynamic state change of articles 40a and 40b, image processing control part 16 discriminates articles 40a and 40b from the objects recognized by image recognizing part 15. With this, image processing control part 16 can determine by identifying change of articles 40a and 40b. Consequently, image processing control part 16 identifies dynamic state change of articles 40a and 40b by articles 40a and 40b being turned over or leaned. Thereby, it can be determined whether the user wants to know the article information.

Then, if image processing control part 16 is certainly determined that the user wants to know the article information, as shown in FIG. 8, it generates article information images 60*a* and 60*b* showing the article information and displays them on display part 11 based on the article information from information management server 20. In this case, the article information from information management server 20 corresponds to each of articles 40*a* and 40*b*. Also, when articles 40*a* and 40*b* are processed foods, the contents of the article information show prices, ingredients, net weights, best-before dates, expiration dates, countries of origin, importers, or the like, for example.

Thereby, article information images 60*a* and 60*b* showing each of article information corresponding to articles 40*a* and 40*b* serving as comparison objects can be provided for the user, simultaneously. Also, each of article information images 60*a* and 60*b* is displayed as correspond to each of articles 40*a* and 40*b*. Thereby, the relationship between each of articles 40*a* and 40*b* and each of article information images 60*a* and 60*b* can be grasped, intuitively.

In addition, as shown in FIG. 8, about the utilization of the display, article information images 60*a* and 60*b* is displayed on right or left. However, it may be displayed up and down. In any case, article information images 60*a* and 60*b* corresponded to each of articles 40*a* and 40*b* may just be displayed.

Also, the decision whether the user wants to know the article information by image processing control part 16 is not limited to the presence or absence of the dynamic state change in articles 40*a* and 40*b*. Namely, for example, in the state as shown in FIG. 7 state A, articles 40*a* and 40*b* may be imaged, continuously. This is because, when the user holds articles 40*a* and 40*b* with left hand 50*a* and right hand 50*b*, the user may look at entire articles 40*a* and 40*b*, the explanation writing of articles 40*a* and 40*b*, or the like, in the state as it is.

In this case, when the state where there is no dynamic state change of articles 40*a* and 40*b* is kept for a specified period of time (for example, about 5 seconds), the user stare at articles 40*a* and 40*b*. Accordingly, it determines that the user wants to know the article information. In addition, the specified period of time that the decision takes does not limit to 5 seconds, and it can be changed, suitably. Also, user may stare as it is, without holding articles 40*a* and 40*b* displayed on the shelf. In this case, when the state where there is no dynamic state change of articles 40*a* and 40*b* is kept for a specific period of time (for example, about 5 seconds), it determines that the user wants to know the article information. Also, in the state where articles 40*a* and 40*b* displayed on the shelf are touched with left hand 50*a* and right hand 50*b*, the user may stare at them as it is. In this case, when the state where there is no dynamic state change of articles 40*a* and 40*b* is kept for a specific period of time (for example, about 5 seconds), it determines that the user wants to know the article information.

In addition, in FIG. 7 state A, it is assumed that one of articles 40*a* or 40*b* is held with left hand 50*a* or right hand 50*b* for the user. In this case, image processing control part 16 certainly determines that the user wants to know the article information as the same as the above. Then, based on the article information from information management server 20, article information images 60*a* and 60*b* showing the article information is generated and is displayed on display part 11. In this case, article information images 60*a* or 60*b* showing the article information corresponds to either of article 40*a* or the 40*b*.

Wireless communicating part 17 transmits the article identification information from image processing control part 16 to information management server 20 or receives the article information from information management server 20.

On the other hand, information management server 20 is provided with wireless communicating part 21, article identifying part 22, and article information acquiring part 23. Wireless communicating part 21 receives the article identification information from HMD 10 as mentioned above and transmits the article information corresponding to the article identification information.

Article identifying part 22 identifies articles 40*a* and 40*b* based on the article identification information from HMD 10. In case that the article identification information is the article image of articles 40*a* and 40*b*, discrimination of articles 40*a* and 40*b* is performed by collating with the article image registered in database 24. Also, in case that the article identification information is the name of article attached on articles 40*a* and 40*b*, collation with the name of article registered in database 24 is performed. In addition, in case that the article identification information is a bar code, it is read as it is and discriminates articles 40*a* and 40*b*.

Article information acquiring part 23 acquires article information corresponding from database 24 based on the identified result of articles 40*a* and 40*b* by article identifying part 22. In database 24, the article information corresponded to each of articles 40*a* and 40*b*, the article image and the name of article for discriminating articles 40*a* and 40*b* are registered.

Then, with reference to FIG. 9, the processing by the side of HMD 10 is explained. In addition, in the processing by the side of HMD 10, when HMD 10 is mounted on the head of the user, imaging by camera 13 is started.

At first, since a state of waiting for imaging of an object by camera 13 in HMD 10 (Step S101: NO), imaging of an object by camera 13 in HMD 10 is performed (Step S101: Yes). Here, for example, as shown in FIG. 7 state A, articles 40*a* and 40*b* are held with left hand 50*a* and right hand 50*b* for the user. At this time, camera 13 in HMD 10 images articles 40*a* and 40*b*, which are the objects, and left hand 50*a* and right hand 50*b* for the user.

When the objects are imaged, image recognizing part 15 recognizes articles 40*a* and 40*b*, which are the objects, and left hand 50*a* and right hand 50*b* for the user (Step S102). As mentioned above, the frame rate of camera 13 is 30 fps, for example. In this case, image recognizing part 15 recognizes articles 40*a* and 40*b*, which are the objects, and left hand 50*a* and right hand 50*b* for the user from arbitrary frame images in the obtained 30 frame images in 1 second.

Next, image processing control part 16 discriminates each of articles 40*a* and 40*b* recognized by image recognizing part 15 (Step S103). Image processing control part 16 transmits each of article identification information that shows the discriminated articles 40*a* and 40*b* to information management server 20 via wireless communicating part 17 (Step S104).

In addition, each of article identification information that shows articles 40*a* and 40*b* may be the article image of articles 40*a* and 40*b*, as mentioned above. Also, article identification information may be the name of article, the bar code, or the like, which are attached on articles 40*a* and 40*b*. Also, when each of article identification information is transmitted to information management server 20 from HMD 10, each of corresponding article information is replied from information management server 20, immediately. However, the processing is described later. Accordingly, in this example, each of corresponding article information is replied from information management server 20.

Also, since imaging of the object by camera 13 is carried out, continuously, in the timing for recognizing the object by image recognizing part 15, image processing control part 16 determines the presence or absence of dynamic state change for either or both of articles 40a and 40b (Step S105).

Here, for example, as shown in FIG. 7 state B, suppose that the user turns over articles 40a and 40b held with left hand 50a and right hand 50b, looks at the entire articles 40a and 40b, looks at the explanation writing on articles 40a and 40b, or the like. In this case, as mentioned above, in the state where marks 41a and 41b of articles 40a and 40b are moved to the back side, articles 40a and 40b currently held with left hand 50a and right hand 50b for the user are imaged by camera 13.

Also, as shown in FIG. 7 state C, suppose that the user leans articles 40a and 40b held with left hand 50a and right hand 50b, looks at the entire articles 40a and 40b, looks at the explanation writing on articles 40a and 40b, or the like. In this case, as mentioned above, in the state where cap 42 of articles 40a and 40b is moved below, articles 40a and 40b currently held with left hand 50a and right hand 50b for the user are imaged by camera 13.

Dynamic state change of articles 40a and 40b can be determined by identifying change of articles 40a and 40b while image processing control part 16 discriminates articles 40a and 40b from the object recognized by image recognizing part 15. Then, if image processing control part 16 determines that there is dynamic state change in articles 40a and 40b (Step S105: Yes), it determines that the user wants to know each of article information. Image processing control part 16 generates article information images 60a and 60b showing each of article information received from information management server 20 and displays each of article information images 60a and 60b on display part 11 (Step S106). Thereby, in the suitable timing as considered that the user wants to know the article information, article information is provided. Also, each of article information images 60a and 60b corresponding to articles 40a and 40b is simultaneously displayed on display part 11.

Here, the contents of article information images 60a and 60b displayed on display part 11 show the prices, ingredients, net weights, best-before dates, expiration dates, countries of origin, importers, or the like, for articles 40a and 40b, as mentioned above. Therefore, articles 40a and 40b can be easily compared by confirming the contents of each of article information images 60a and 60b.

Next, image processing control part 16 determines whether or not articles 40a and 40b, which are the objects recognized by image recognizing part 15, can be discriminated (Step S107). Namely, image processing control part 16, while articles 40a and 40b held with left hand 50a and the right hand 50b for the user are imaged by camera 13, discriminates articles 40a and 40b from the recognition result by image recognizing part 15. On the other hand, if articles 40a and 40b are returned to the their shelf, distinction of articles 40a and 40b from the recognition result by image recognizing part 15 is not possible because of being away the imaging range of camera 13.

Therefore, if image processing control part 16 can perform distinction of articles 40a and 40b (Step S107: Yes), it continues displaying on display part 11 each of article information images 60a and 60b showing the article information. On the other hand, if distinction of articles 40a and 40b becomes impossible (Step S107: No), image processing control part 16 deletes the display of each of article information images 60a and 60b showing article information (Step S108). Thereby, excessive article information images 60a and 60b are avoided to come into a visual field.

On the other hand, if there is no dynamic state change in either or both of articles 40a and 40b in Step S105 (Step S105: No), image processing control part 16 determines whether or not a specified period of time has passed (for example, about 5 seconds) (Step S109). That is, for example, in the state as shown in FIG. 7 state A, articles 40a and 40b may image by camera 13, continuously. This is because, as mentioned above, the user does not move articles 40a and 40b held with left hand 50a and right hand 50b, and he or she may look the entire articles 40a and 40b in the state as it is, may look the explanation writing on articles 40a and 40b, or the like.

In this case, if the state where the state where there is no dynamic state change of articles 40a and 40b is kept for a specified period of time (for example, about 5 seconds) (Step S109: Yes), image processing control part 16 determines that the user wants to know the article information. Image processing control part 16 generates each of article information images 60a and 60b showing the article information received from information management server 20 and simultaneously displays each of article information images 60a and 60b on display part 11 (Step S106). As mentioned above, a user may stare as it is without holding articles 40a and 40b displayed on the shelf. In this case, when a specified period of time has passed (for example, about 5 seconds), image processing control part 16 determines that the user wants to know the article information. Thereby, as the same as the above, article information is provided in the suitable timing as considered that the user wants to know the article information. Also, since each of article information images 60a and 60b is simultaneously displayed on display part 11, articles 40a and 40b can be compared, easily.

On the other hand, if image processing control part 16 determines that the state where there is no dynamic state change of either or both articles 40a and 40b has not passed for a specified period of time (for example, about 5 seconds) (Step S109: No), it determines whether or not articles 40a and 40b, which are the objects recognized by image recognizing part 15, can be discriminated (Step S110). If articles 40a and 40b can be discriminated (Step S110: Yes), image processing control part 16, determines whether articles 40a and 40b have change of dynamic state (Step S105).

On the other hand, if image processing control part 16 cannot discriminate articles 40a and 40b (Step S110: No), the display of article information images 60a and 60b showing the article information on display part 11 is not performed. That is, as mentioned above, while articles 40a and 40b held with left hand 50a and right hand 50b for the user are imaged by camera 13, image processing control part 16 can discriminate articles 40a and 40b from the recognition result by image recognizing part 15.

On the other hand, although the user has once held articles 40a and 40b, he or she may return articles 40a and 40b to their shelf, immediately. Also, as mentioned above, a user may stare as it is without holding articles 40a and 40b displayed on the shelf. However, he or she may avert a line of sight from articles 40a and 40b, which are stared, in a short time. Also, although the user has once held articles 40a and 40b, he or she may put into a basket as it is.

In this case, as mentioned above, articles 40a and 40b become away the imaging range of camera 13, image processing control part 16 can not perform distinction of articles 40a and 40b from the recognition result by image recognizing part 15. Therefore, image processing control part 16, when distinction of articles 40a and 40b becomes impossible in a short time, does not determines whether or not the user wants to know the article information. Thereby, if the user does not think to know the article information, article information images 60a and 60b showing article information is not shown on display part 11. Thereby, the display of excessive article information images 60a and 60b is avoidable.

Then, with reference to FIG. 10, the processing by the side of information management server 20 is explained. At first, reception waiting of each of article identification information from HMD 10 side is performed (Step S120: No). If wireless communicating part 21 receives each of article identification information from HMD 10 side (Step S120: Yes), article identification part 22 identifies articles 40a and 40b based on each of article identification information (Step S121).

Here, when articles 40a and 40b are identified, as mentioned above, in case that each of article identification information is an article image of articles 40a and 40b, collation with the article image registered in database 24 is performed. Also, in case that each of article identification information is the name of article attached on articles 40a and 40b, collation with the name of article registered into database 24 is performed. In addition, in case that each of article identification information is a bar code, it is read as it is and is discriminated articles 40a and 40b.

Next, article information acquiring part 23 acquires each of corresponding article information from database 24 based on the identified result by article identifying part 22 (Step S122). Then, when each of article information is acquired by article information acquiring part 23, wireless communicating part 21 transmits each of the acquired article information to HMD 10 side (Step S123).

Thus, in the present embodiment, real space is imaged by camera 13, which is a form of the imaging circuit of HMD 10, which is a form of the article information providing apparatus. Also, the object imaged by camera 13 is recognized by image recognizing part 15, which is a form of the object recognizing circuit. Also, articles 40a and 40b serving as comparison objects are discriminated by image processing control part 16, which is a form of an article discriminating circuit, from the object recognized by image recognizing part 15. Then, each of article identification information that shows discriminated articles 40a and 40b is transmitted to information management server 20 via wireless communicating part 17, which is a form of the first information communicating circuit. Also, when each of article information of articles 40a and 40b from wireless communicating part 21, which is a form of the first information communicating circuit in information management server 20 is received, article information images 60a and 60b showing each of article information by image processing control part 16 are simultaneously displayed on display part 11 based on the state of the discriminated article.

In addition, in information management server 20 side, articles 40a and 40b are identified by article identifying part 22 based on each of article identification information. Then, each of corresponding article information is acquired by article information acquiring part 23 from database 24, which the article information is registered, based on each identified result of articles 40a and 40b by article identifying part 22. Then, it is transmitted to HMD 10 via wireless communicating part 21, which is a form of the second information communicating circuit.

Thus, by cooperating with information management server 20, based on the state of articles 40a and 40b discriminated by image processing control part 16 in HMD 10, the article information images showing each of article information is simultaneously displayed on display part 11. Thereby, articles 40a and 40b can be compared easily.

In addition, the display of the article information image showing the article information for display part 11 by image processing control part 16 is performed in case that the dynamic state change of discriminated articles 40a and 40b is identified or in case that where there is no dynamic state change of discriminated articles 40a and 40b for a specified period of time. This is a condition for determining whether or not the user wants to know the article information. When these conditions are fulfilled, by displaying on display part 11 article information images 60a and 60b showing article information, excessive article information images 60a and 60b is never displayed. Also, since the excessive article information image may not come into a visual field of the user, the user does not feel troublesomeness.

In the present embodiment, although HMD 10 is explained as used, for example, at a store, it is not limited to the example. For example, it is also possible to be used in public facilities, such as a hospital, a library, and a civic hall, various leisure facilities, further, transportation facilities, such as a road, a railroad, a port, and an airport, or the like.

Also, although the present embodiment is explained as a case where articles 40a and 40b are considered as a processed food, they are not only the case, and they may be other foodstuffs, such as a perishable food, a palatable food, a drink article, and health food, or the like. Also, in the present embodiment, although it explains a case that articles 40a and 40b are displayed on the shelf in the store, for articles 40a and 40b placed on the other places, similarly, the present disclosure can be worked.

In addition, although the present embodiment is explained in the case where articles 40a and 40b is considered as a processed food, it is not limited to this. For example, they may be other foodstuffs, such as a perishable food, a palatable food, a drink article, or a health food, or the like. Also, although the present embodiment explained in the case that articles 40a and 40b are displayed on the shelf in the store, the present disclosure can be worked for articles 40a and 40b placed on the other places, similarly.

In the first and the second embodiment, HMD 10 is explained as used, for example, at a store. However, it is not limited to this example. It is also possible to use in public facilities, such as a hospital, a library, and a civic hall, various leisure facilities, and further transportation facilities, such as a road, a railroad, a port, an airport, or the like.

What is claimed is:

1. An article information providing apparatus comprising:
   a display circuit that displays an article information image showing article information;
   an imaging circuit that images real space;
   an object recognizing circuit that recognizes an object imaged by the imaging circuit; and
   an article discriminating circuit that discriminates an article and a hand from the object recognized by the object recognizing circuit and displays the article information image on the display circuit based on a state of the discriminated article;
   wherein
   the article discriminating circuit determines whether or not the discriminated article is moved by the discriminated hand and, when it is determined that the article is moved and a dynamic state change is identified by the article being turned over in a state where a location of a mark of the article is moving to a back side of the article from a near side of the article or being leaned in a state where a cap of the article is moving from an upper part of the article to a lower part of the article, performs said display of the article information image on the display circuit.

2. The article information providing apparatus according to claim 1, wherein
the article discriminating circuit displays the article information image on the display circuit when there is no dynamic state change of the discriminated article for a specified period of time.

3. The article information providing apparatus according to claim 1, wherein
the article discriminating circuit discriminates the article that serves as a comparison object from the object recognized by the object recognizing circuit and displays on the display circuit the article information image corresponded to each article serving as the comparison object based on the state of the discriminated article.

4. The article information providing apparatus according to claim 3, wherein
the article discriminating circuit, when there is no dynamic state change of the discriminated article for the specified period of time, displays on the display circuit the article information image corresponded to each article.

5. The article information providing apparatus according to claim 1, wherein following the display of the article information image, the article information image is deleted from the display circuit when the article in the object is not discriminated.

6. An article information providing system having an article information providing apparatus and an information management server, and
the article information providing apparatus comprising:
a display circuit that displays an article information image showing article information;
a first information communicating circuit that transmits and receives information to the information management server;
an imaging circuit that images real space;
an object recognizing circuit that recognizes an object imaged by the imaging circuit;
an article discriminating circuit that discriminates an article and a hand from the object recognized by the object recognizing circuit, transmits an article identification information showing a discriminated article to the information management server via the first information communicating circuit, receives article information of the article from the information management server, and displays on the display circuit the article information image according to a dynamic state change of the discriminated article, wherein
the article discriminating circuit determines whether or not the discriminated article is moved by the discriminated hand and, when it is determined that the article is moved and a dynamic state change is identified by the article being turned over in a state where a location of a mark of the article is moving to a back side of the article from a near side of the article or being leaned in a state where a cap of the article is moving from an upper part of the article to a lower part of the article, performs said display of the article information image on the display circuit; and the information management server comprising:
a database that with registers the article information;
a second information communicating circuit that transmits and receives information to the article information providing apparatus; an article identifying circuit that identifies the article based on the article identification information; and
an article information acquiring circuit that acquires article information applicable from the database based on an identified result of the article by the article identifying circuit and transmits to the article information providing apparatus via the second information communicating circuit.

7. The article information providing system according to claim 6, wherein:
in the database, an article image and a name of article for specifying the article are registered;
the article identifying circuit, when the article identification information is the article image or the name of article, identifies the article by collation with the article image or the name of article registered in the database; and
the article information acquiring circuit acquires corresponding article information from the database based on the identified result by the article identifying circuit.

8. The article information providing system according to claim 6, wherein
the article discriminating circuit displays the article information image on the display circuit when there is no dynamic state change of the discriminated article for a specified period of time.

9. The article information providing system according to claim 6, wherein
the article discriminating circuit discriminates an article serving as a comparison object from the object recognized by the object recognizing circuit,
transmits each article identification information showing the discriminated article to the information management server via the first information communicating circuit,
receives each of article information of the article from the information management server, and
displays on the display circuit the article information image corresponded to the each article serving as the comparison object based on the state of the discriminated article.

10. The article information providing system according to claim 6, wherein following the display of the article information image, the article information image is deleted from the display circuit when the article in the object is not discriminated.

11. The article information providing system according to claim 9, wherein
the article discriminating circuit, when there is no dynamic state change of the discriminated article for the specified period of time, displays on the display circuit the article information image corresponded to each article.

12. An article information provision method executed by an article information providing apparatus, comprising the steps of:
displaying an article information image that displays article information via a display circuit;
imaging real space via an imaging circuit;
recognizing an imaged object via an object recognizing circuit;

discriminating an article and a hand from the recognized object via an article discriminating circuit; and determining whether or not the discriminated article is moved by the discriminated hand and, when it is determined that the article is moved and a dynamic state change is identified by the article being turned over in a state where a location of a mark of the article is moving to a back side of the article from a near side of the article or being leaned in a state where a cap of the article is moving from an upper part of the article to a lower part of the article, displaying the article information image on the display circuit.

13. The article information provision method according to claim 12, further comprising, following the display of the article information image, deleting the article information image from the display circuit when the article in the object is not discriminated.

14. The article information provision method according to claim 12, wherein
the article information image is displayed on the display circuit when there is no dynamic state change of the discriminated article for a specified period of time.

15. The article information provision method according to claim 12, wherein
the article discriminating circuit discriminates the article that serves as a comparison object from the object recognized by the object recognizing circuit and displays on the display circuit the article information image corresponded to each article serving as the comparison object based on the state of the discriminated article.

16. The article information provision method according to claim 15, wherein
the article discriminating circuit, when there is no dynamic state change of the discriminated article for the specified period of time, displays on the display circuit the article information image corresponded to each article.

* * * * *